US008966177B2

(12) United States Patent
Martin

(10) Patent No.: US 8,966,177 B2
(45) Date of Patent: *Feb. 24, 2015

(54) METHOD, APPARATUS AND SYSTEM FOR OPTIMIZING IMAGE RENDERING ON AN ELECTRONIC DEVICE

(71) Applicant: BlackBerry Limited, Waterloo (CA)

(72) Inventor: Daryl Joseph Martin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,715

(22) Filed: Jul. 26, 2013

(65) Prior Publication Data

US 2013/0311620 A1   Nov. 21, 2013

Related U.S. Application Data

(63) Continuation of application No. 12/394,000, filed on Feb. 26, 2009, now Pat. No. 8,499,118.

(51) Int. Cl.
*G06F 13/00* (2006.01)
*G06F 3/06* (2006.01)

(52) U.S. Cl.
CPC .............. *G06F 3/0653* (2013.01); *G06F 3/067* (2013.01)
USPC .......................................... 711/115; 711/154

(58) Field of Classification Search
CPC .............................. G06F 3/0653; G06F 3/067
USPC ................................................ 711/115, 154
See application file for complete search history.

(56) References Cited

U.S. PATENT DOCUMENTS 8,499,118 B2   7/2013   Martin

*Primary Examiner* — Reba I Elmore
(74) *Attorney, Agent, or Firm* — Perry + Currier Inc.; Kristjan Spence

(57) ABSTRACT

Portable electronic devices typically have reduced computing resources, including reduced screen size. The method, apparatus and system of the present specification provides, amongst other things, an intermediation server configured to access network content that is requested by a portable electronic device and to analyze the content including analyzing images in that content. The intermediation server is further configured to accommodate the computing resources of the portable electronic device as part of fulfilling content requests from the portable electronic device.

18 Claims, 7 Drawing Sheets

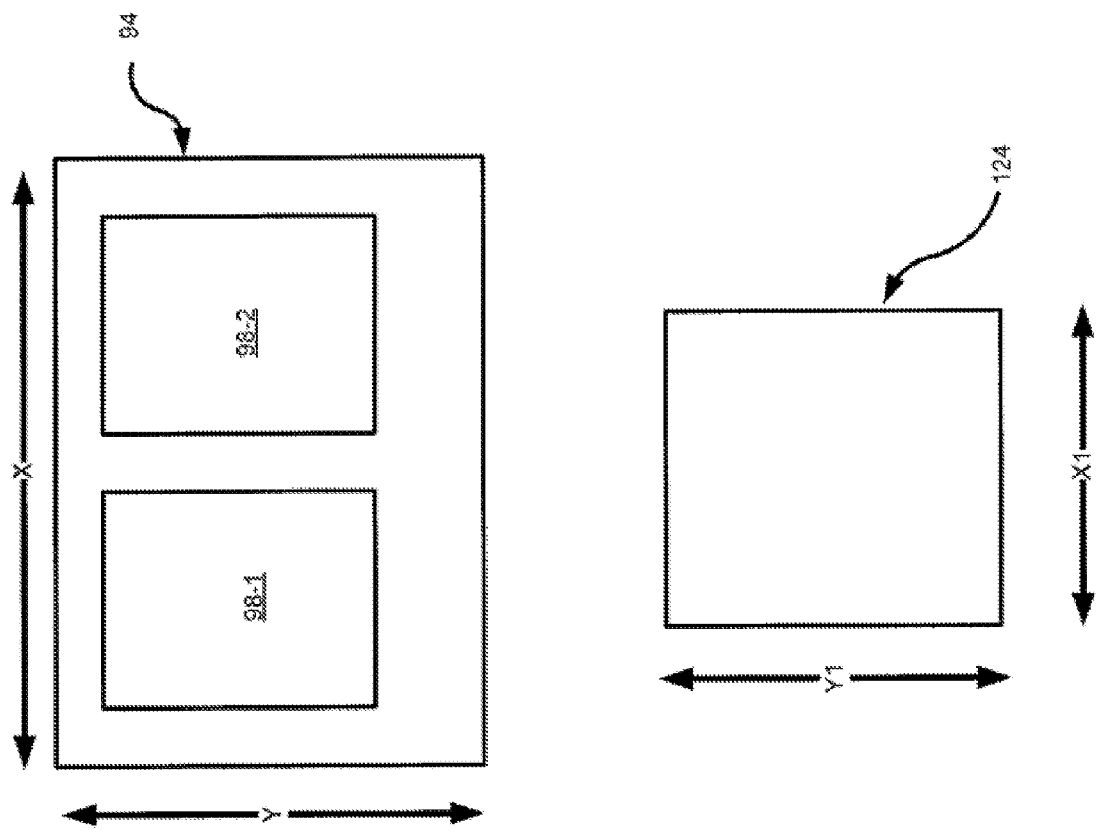

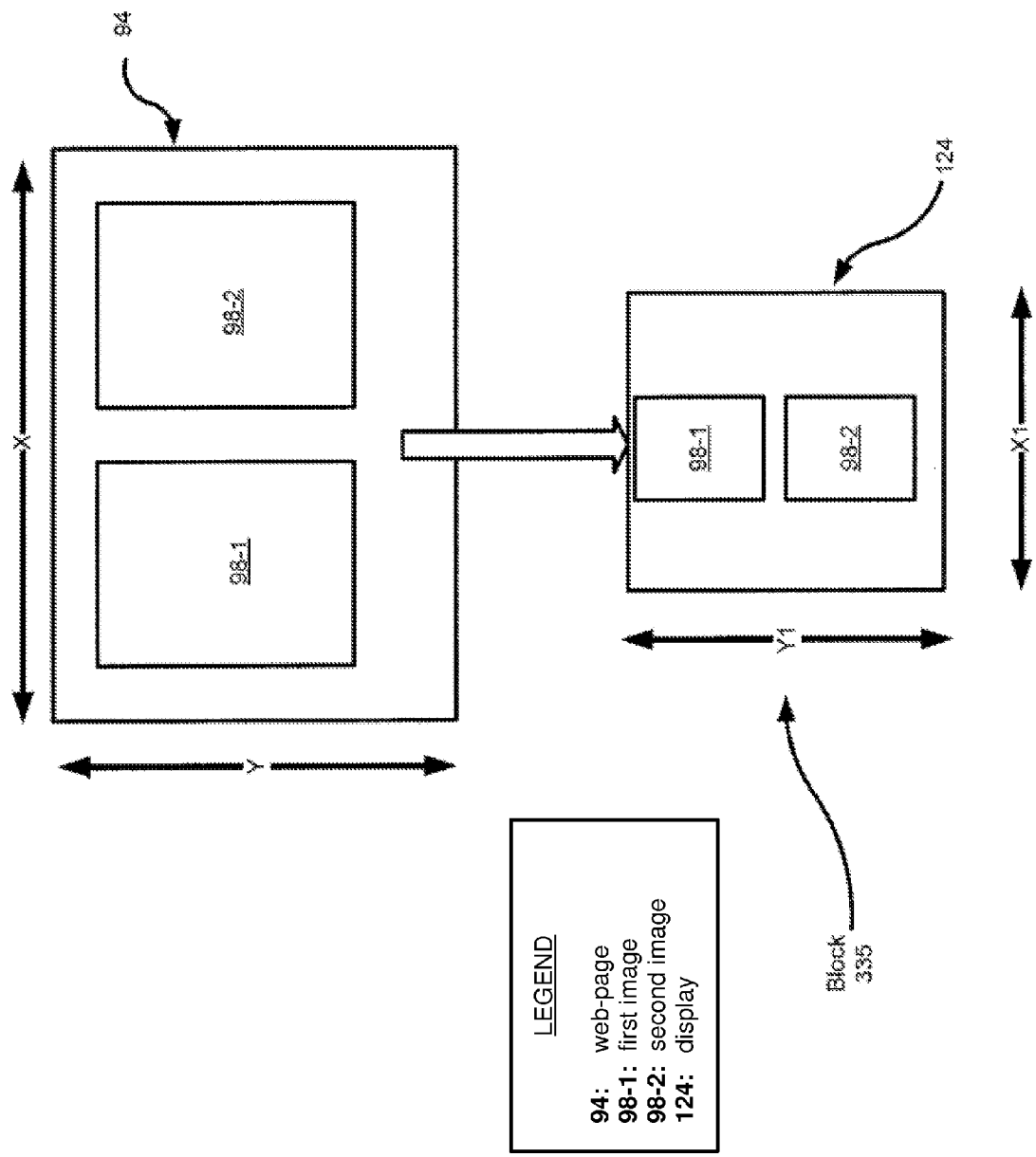

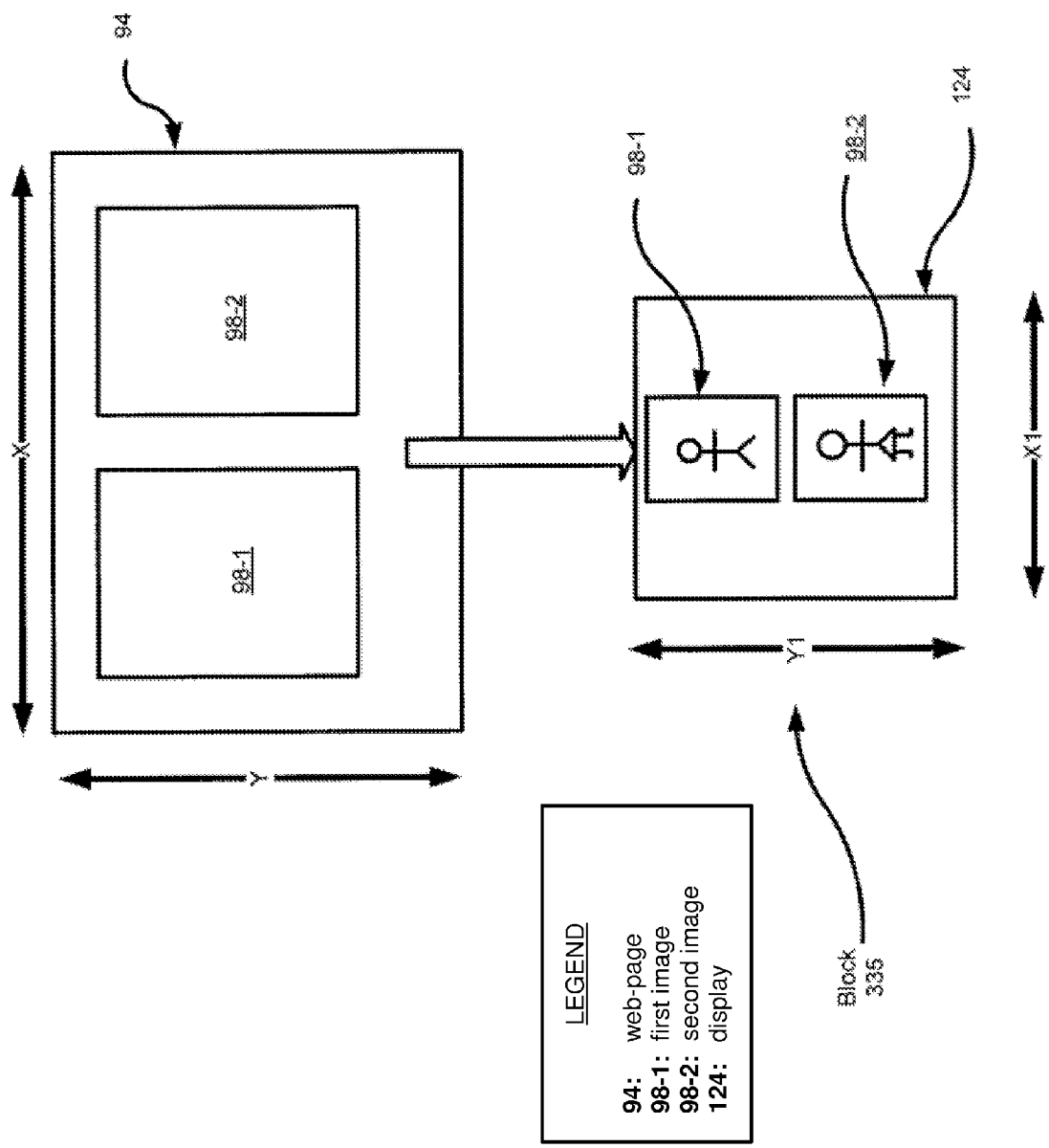

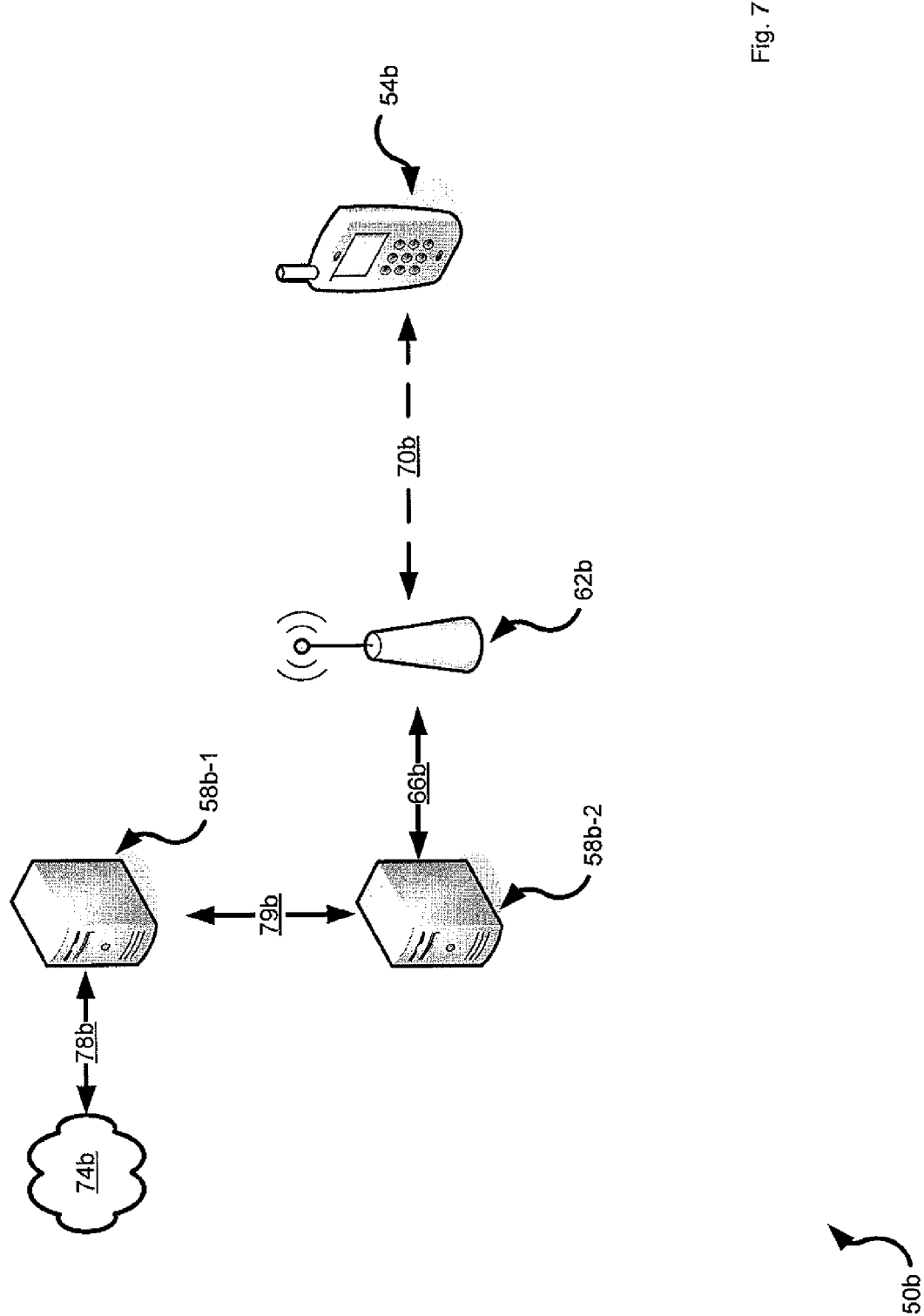

METHOD, APPARATUS AND SYSTEM FOR OPTIMIZING IMAGE RENDERING ON AN ELECTRONIC DEVICE

CROSS REFERENCE TO RELATED APPLICATION

This application is a continuation of U.S. application Ser. No. 12/394,000 (U.S. Pat. No. 8,499,118), filed Feb. 26, 2009, the contents of which are hereby incorporated by reference.

FIELD

The present specification relates generally to telecommunications and more specifically relates to a method, apparatus and system for optimizing image rendering on an electronic device.

BACKGROUND

A common problem with providing web-browsing on portable electronic devices is that the computing and network resources for portable electronic devices are constrained, at least relative to desktop electronic devices, and typically web-pages are optimized for desktop electronic devices. Generation of such desktop optimized web-pages on portable electronic devices is therefore often slow, at best, to the point where such generation is impractical.

Many solutions to this problem are contemplated, including provision of static web-pages optimized for portable electronic devices, or providing dynamic transcoding of desktop-optimized web-pages for portable electronic devices. The provision of static web-pages can be problematic as it involves the preparation of different sets of web-pages for different computing environments. Transcoding can obviate the preparation of different web-pages, but current transcoding processes do not adequately address certain problems that can arise during transcoding and which can still ultimately result in poor performance at the portable electronic device.

Hypertext markup language (HTML) syntax provides a way to specify the location, width, height, source, and alignment of a particular image via the IMG tag. This information, along with other tags, can be used when rendering a webpage to ensure the pictures are in the intended position. During the rendering process a webpage may change drastically when an image is inserted based on its properties as it can require a complete shift of all the text on the screen.

When a mobile device attempts to render a webpage with images, it can run into a few problems. First, the low power processor can take a long time to render a page upon receipt of an image. Second, due to the unknown size of certain images a website displayed on a mobile may change a lot with each new image downloaded as it attempts to "fit" the image into the correct position on the page. Third, each image loaded on a device can cause the currently displayed page location to shift such that the browser is unusable until the page is fully loaded.

BRIEF DESCRIPTION OF THE DRAWINGS

FIG. 4 shows the web-page of FIG. 1 and the display of FIG. 2 in relation to each other.

FIG. 5 shows exemplary generation of modified image place holders on the display of FIG. 2.

FIG. 6 shows exemplary generation of modified images on the place holders generated in FIG. 5.

FIG. 7 shows a modified version of the system of FIG. 1.

DESCRIPTION

Figure 1:
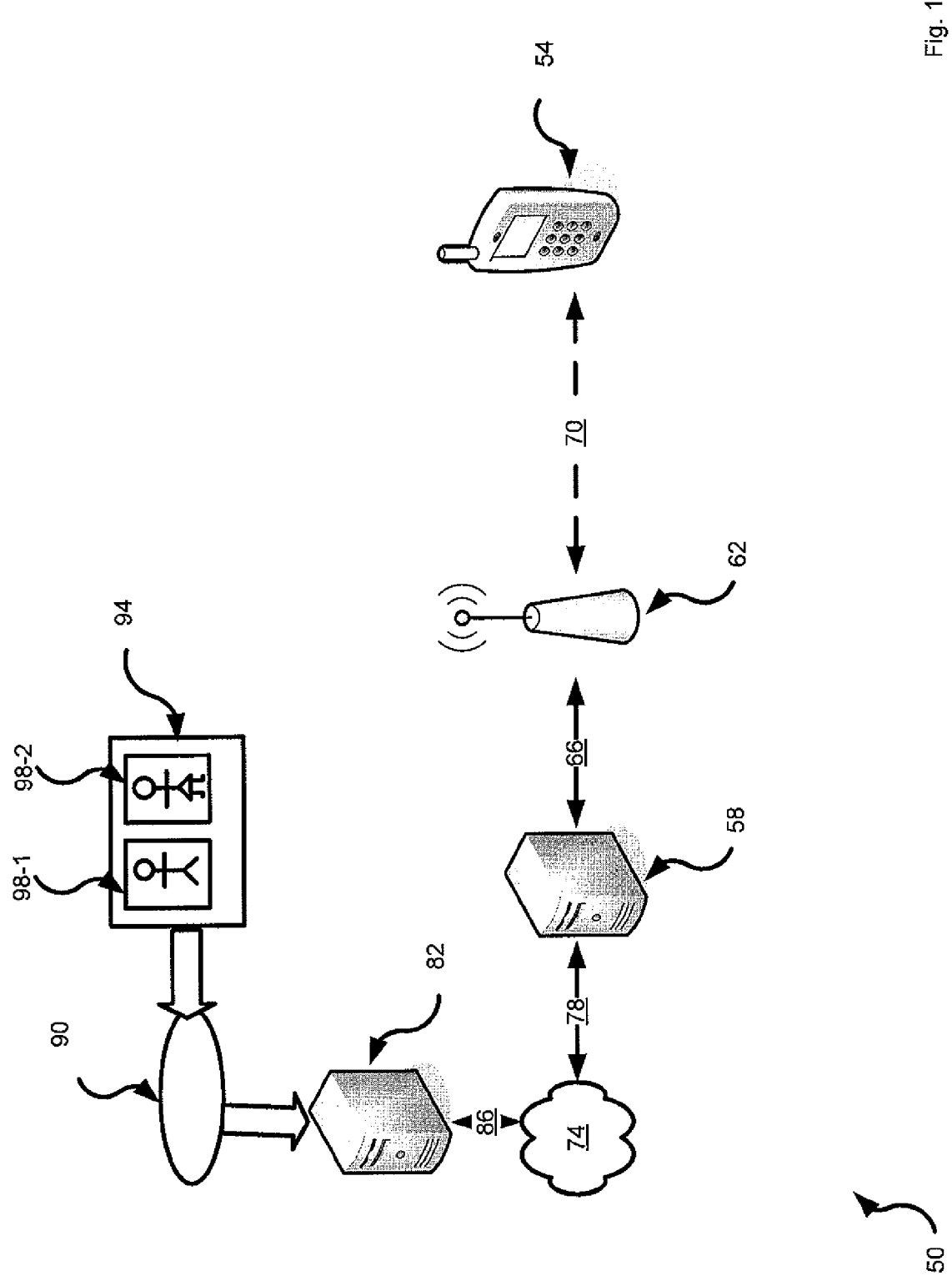
FIG. 1 shows a schematic representation of a system for optimized image rendering.

This specification relates to reducing the amount of hyper text markup language (HTML) rendering that a mobile device has to perform by provision of an image place holder. For this specification a portable electronic device is provided that communicates with an intermediation server where the device is requesting index.html.

The portable electronic device will send off the initial request for index.html without any changes to the initial request. The intermediation server will fetch the requested index.html and also attempt to optimize the HTML by removing unnecessary information to minimize the data sent to the portable electronic device. During this scan the intermediation server will scan for all IMG tags in an attempt to determine the location of all images needed in the index.html page. Once this scan is completed the intermediation server will then proceed to fetch these images from the web server, regardless of whether the device requests them or not, and continue to process each image.

When either all or a defined subset of the images are fetched the intermediation server will then modify each IMG tag in the index.html with the information generated from the compression. Some images may not have sizes associated with them and some may have new sizes that have to be adjusted post-transcoding. All this data will then be sent to the portable electronic device in the initial response so the device can properly render the page on its first pass. Further enhancements can be provided to increase the speed or performance of the intermediation server by taking advantage of caching technologies such as a local file cache to speed up the rate at which the index.html is returned. This cache can keep track of a plurality of resolution and transcoding options which generated the original index.html with the original IMG tags and modified index.html with the modified IMG tags. For example, five separate devices with different screen characteristics can generate five separate index.html files for the exact same webpage depending on resolution and size.

Since the portable electronic device has been provided with the exact location and size of each image, thanks to the intermediation server, the portable electronic device can generate the page as if the images were actually loaded after the initial response.

The portable electronic device can then display the images by fetching the actual content via a HTTP GET request but the portable electronic device will not have to generate the page again, just insert the newly retrieved images over the place holder. This will reduce the effects that these images have on generation and also will allow interaction with page after the first request, instead of having to wait for images to shift when they are finally loaded.

An aspect of the specification provides a portable electronic device, comprising: a display; a network interface; a processor interconnected with the display and the network interface, the processor configured to: send a request for content to an intermediation server via the network interface, the content including images and unmodified image tags specifying locations and dimensions for respective ones of the images; receive, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and control the display to present the content excluding the images, and to present image place holders having the modified locations and dimensions, using the modified image tags.

The processor can be further configured to: after controlling the display to present the image place holders and the content excluding the images, receive modified images from the intermediation server via the network interface; the modified images generated by the intermediation server based on the modified image tags; and control the display to render the modified images within the image place holders.

The modified images can have dimensions corresponding to the modified dimensions specified in the modified image tags.

The processor can be configured to render the modified images without moving the content excluding the images as presented on the display.

The portable electronic device can further comprise an input device interconnected with the processor; the processor can be configured to send the request for content in response to input received from the input device.

The processor can be further configured to send the size of the display to the intermediate server with the request for content.

Another aspect of the specification provides a method in a portable electronic device having a display, a network interface and an input device each interconnected with a processor, the method comprising: sending a request for content to an intermediation server via the network interface, the content including images and unmodified image tags specifying locations and dimensions for respective ones of the images; receiving, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and presenting the content excluding the images, and presenting image place holders having the modified locations and dimensions, using the modified image tags.

The method can further comprise: after controlling the display to present the image place holders and the content excluding the images, receiving modified images from the intermediation server via the network interface; the modified images generated by the intermediation server based on the modified image tags; and rendering the modified images within the image place holders on the display.

The modified images can have dimensions corresponding to the modified dimensions specified in the modified image tags.

The rendering can comprise rendering the modified images without moving the content excluding the images as presented on the display.

The sending can be performed in response to input received at the processor from the input device.

The method can further comprise sending the size of the display to the intermediate server with the request for content.

A further aspect of the specification provides a non-transitory computer-readable medium storing a plurality of computer-readable instructions executable by a processor of a portable electronic device having a display, a network interface and an input device each interconnected with the processor, for performing a method comprising: sending a request for content to an intermediation server via the network interface, the content including images and unmodified image tags specifying locations and dimensions for respective ones of the images; receiving, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and presenting the content excluding the images, and presenting image place holders having the modified locations and dimensions, using the modified image tags.

The method can further comprise: after controlling the display to present the image place holders and the content excluding the images, receiving modified images from the intermediation server via the network interface; the modified images generated by the intermediation server based on the modified image tags; and rendering the modified images within the image place holders on the display.

The modified images can have dimensions corresponding to the modified dimensions specified in the modified image tags. The rendering can comprise rendering the modified images without moving the content excluding the images as presented on the display. The sending can be performed in response to input received at the processor from the input device. The method can further comprise sending the size of the display to the intermediate server with the request for content.

Referring now to FIG. 1, a system for optimized web-page generation in a portable electronic device is indicated generally at 50. In a present embodiment, system 50 comprises a plurality of portable electronic devices 54 and at least one intermediation server 58. A wireless base station 62 interconnects electronic device 54 and intermediation server 58. A backhaul link 66 interconnects base station 62 with server 58. At least one bearer path 70, typically wireless, can be used to interconnect base station 62 with electronic device 54. In a present exemplary embodiment, bearer path 70 can be based on Global System for Mobile communications (GSM), General Packet Radio Service (GPRS), Enhanced Data Rates for GSM Evolution (EDGE), and the Third-generation mobile communication system (3G), Institute of Electrical and Electronic Engineers (IEEE) 802.11 (WiFi) or other wireless protocols. In variations, path 70 can be wired.

Intermediation server 58 is also connected to a network 74 via another backhaul link 78. Network 74 can be any type of network that can host content that is accessible to device 54. In a present embodiment, network 74 is the Internet and connects to a web server 82 which connects to network 74 by another backhaul link 86.

Web server 82 is, in turn, configured to host a web-site 90 that comprises a web-page 94. Web-page 94 itself is comprised of a first image 98-1 and a second image 98-2 (collectively, images 98 and generically, image 98), each of which is oriented and sized on web-page 94 in a manner that is optimized for a desktop computing browsing environment.

Figure 2:
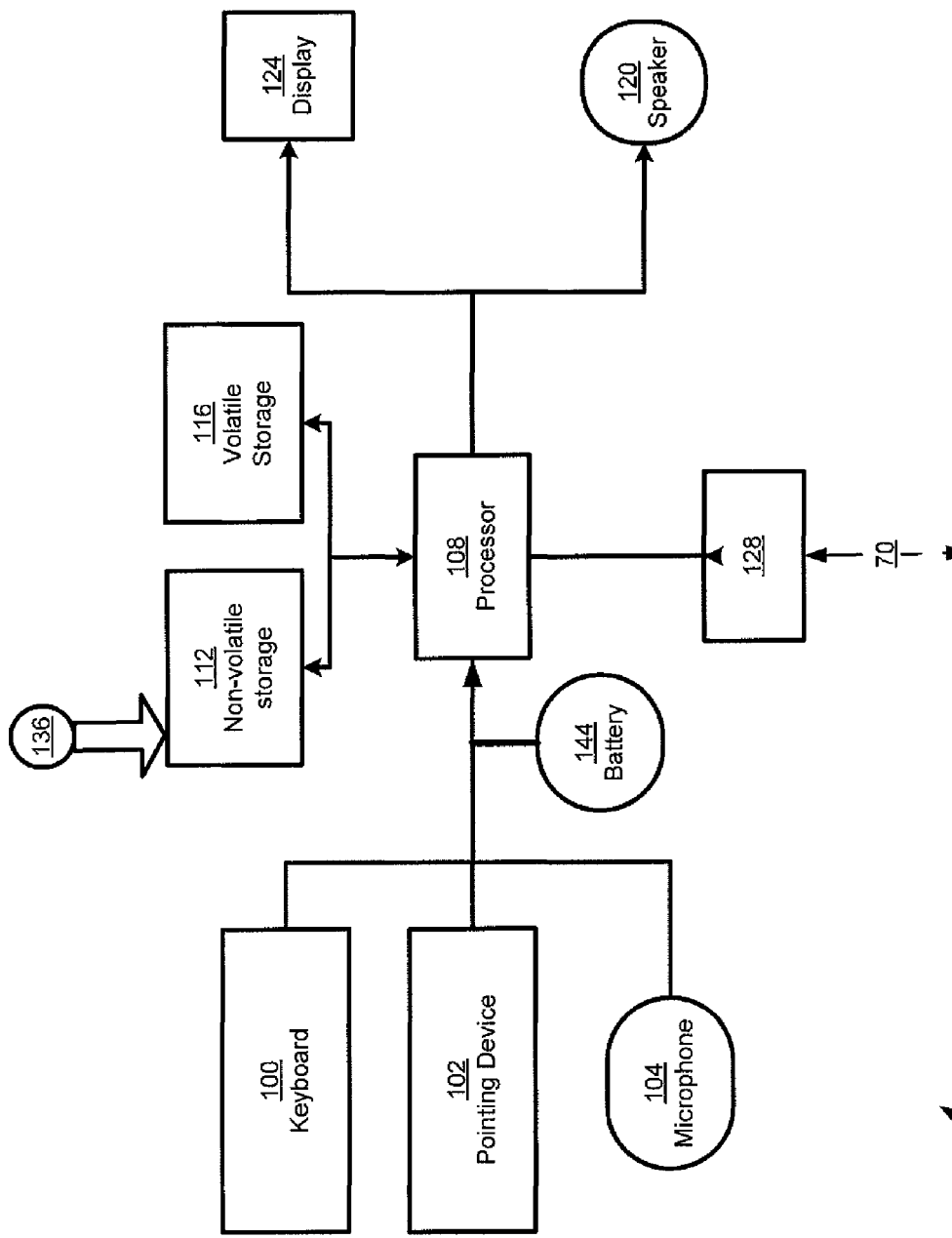
FIG. 2 shows a schematic representation of the electronic device shown in the system of FIG. 1.

Referring now to FIG. 2, electronic device 54 can be any type of computing device that can be used in a self-contained manner and to interact with content available over network 74. Interaction includes displaying of information on electronic device 54 as well as receiving input at electronic device 54 that can in turn be sent back over network 74. It should be emphasized that the structure in FIG. 2 is purely exemplary, and contemplates a device that can be used for both wireless voice (e.g. telephony) and wireless data (e.g. email, web browsing, text) communications. In a present embodiment, electronic device 54 is a portable electronic device with the combined functionality of a personal digital assistant, a cell phone, and an email paging device. (Although variants on device 54 can include a palm top computer or laptop computer with a reduced screen such as an ASUS EEE from ASUSTek Computer Inc. of Taiwan). Many well known cellular telephone models, or variants thereof, are suitable for the present embodiment.

Device 54 thus includes a plurality of input devices which, in a present embodiment, include a keyboard 100, a pointing device 102, and a microphone 104. Pointing device 102 can be implemented as a track wheel, trackball or the like. Other input devices, such as a touch screen are also contemplated. Input from keyboard 100, pointing device 102 and microphone 104 is received at a processor 108. Processor 108 is configured to communicate with a non-volatile storage unit 112 (e.g. Erasable Electronic Programmable Read Only Memory ("EEPROM"), Flash Memory) and a volatile storage unit 116 (e.g. random access memory ("RAM")). Programming instructions that implement the functional teachings of device 54 as described herein are typically maintained, persistently, in non-volatile storage unit 112 and used by processor 108 which makes appropriate utilization of volatile storage 116 during the execution of such programming instructions.

Processor 108 in turn is also configured to control a speaker 120 and a display 124. Processor 108 also contains at least one network interface 128, which is implemented in a present embodiment as radios configured to communicate over bearer path 70. In general, it will be understood that interface(s) 128 is (are) configured to correspond with the network architecture that defines a particular bearer path 70. It should be understood that in general a wide variety of configurations for device 54 are contemplated.

In a present embodiment, device 54 is also configured to maintain a web-browser application 136. Web-browser application 136 is maintained within non-volatile storage 112. Processor 108 is configured to execute web-browser application 136, receive input from keyboard 100 relative to web-browser application 136, and to generate graphical interfaces on display 124. Processor 108 is further configured to request content from network 74 via a bearer path 70, as will be discussed further below.

Device 54 also includes a battery 144 or other power supply. Battery 144 provides power to components within device 54.

Server 58 can be based on any well-known server environment including a module that houses one or more central processing units, volatile memory (e.g. random access memory), persistent memory (e.g. hard disk devices) and network interfaces to allow server 58 to communicate over network 74 and with base station 62. For example, server 58 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 58 is contemplated. Server 82 can be based on the same or different computing environment as server 58.

Figure 3:
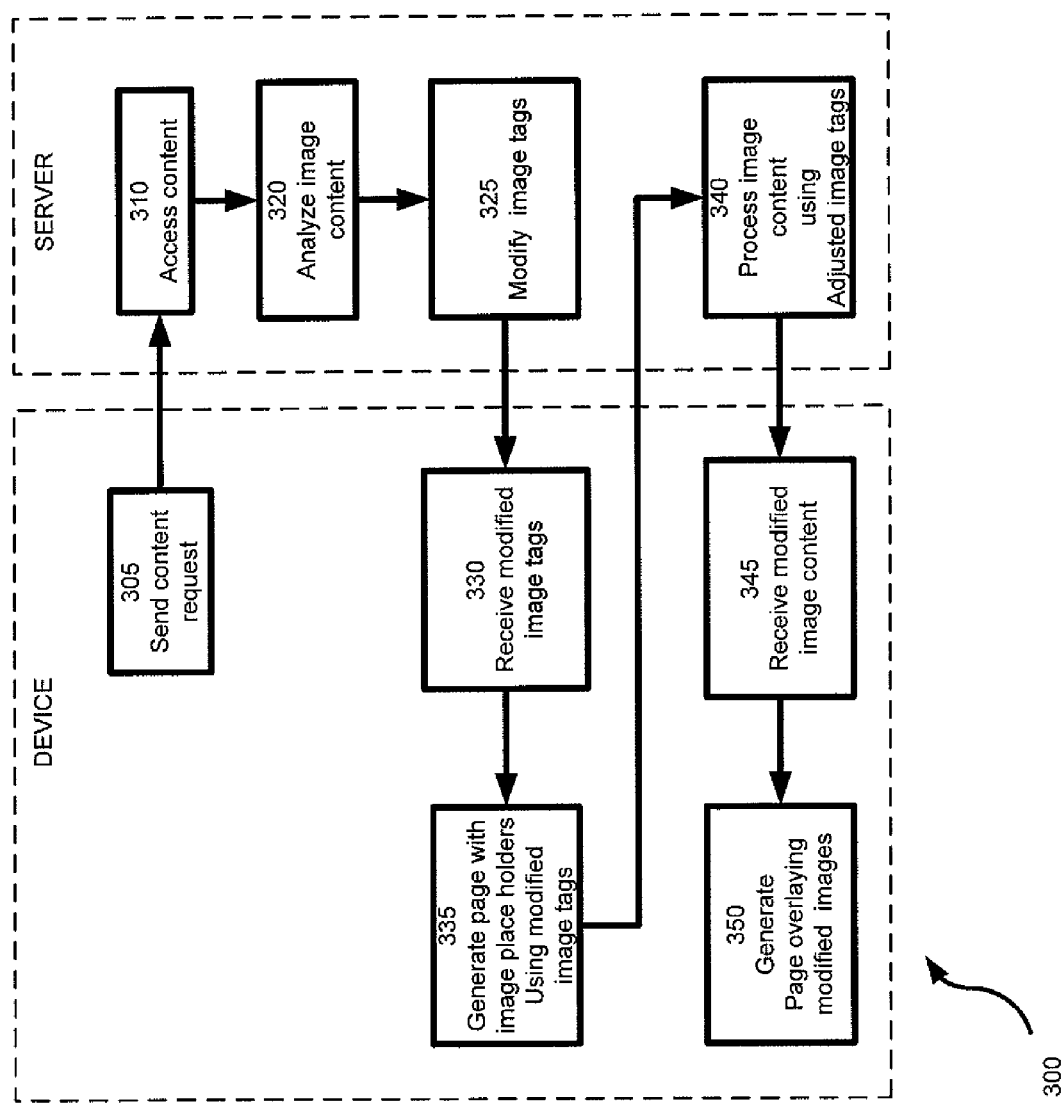
FIG. 3 shows a flow-chart depicting a method for image rendering.

Referring now to FIG. 3, a flowchart depicting a method of optimizing image rendering is indicated generally at 300. Method 300 can be implemented on system 50 or a suitable variation thereof. Block 305 comprises sending a content request from a wireless electronic device, which in turn is received at an intermediation server. In a present embodiment the request is sent from device 54 to server 58 via bearer path 70, using any appropriate channel on that bearer path 70 that is active at the time the request is generated. In a present embodiment the content request is generated by web-browser application 136 on device 54, which is selecting web-page 94 hosted on web-server 82 connected to network 74.

At block 310, server 58 has received the content request from block 305 and accesses the requested content. In the present example, server 58 will access the web-server 82 on network 74 in order to fulfill block 310. At block 320, the content accessed at block 310 is analyzed. Such an analysis can include, in the case of web-page 94, for example analyzing location and sizes of images 98 on web-page 94. The analysis can include an analysis of IMG tags associated with images 98. Of note is that at block 310, only the IMG tags associated with images 98 need to be downloaded to server 58, and images 98 themselves do not need to be downloaded.

Block 325 comprises adjusting image tags associated with the content accessed at block 310. The image tags are adjusted according to the hardware characteristics of device 54. Server 58 is thus configured to maintain a data record that includes the hardware characteristics of device 54. Such hardware characteristics can be pre-programmed in server 58, or alternatively, device 54 can send such characteristics as part of the content request from block 305. Such hardware characteristics can thus include the size of display 124, as well as any other information about device 54 that can be used as part of the teachings herein.

To further assist in understanding block 325, FIG. 4 shows an example of web-page 94 and display 124. Web-page 94 in FIG. 4 shows web-page 94 which has been created for a display having a horizontal dimension of "X" units, and a vertical dimension of "Y" units, while display 124 has a horizontal dimension of "X1" units, which is less than "X", and a vertical dimension of "Y1" units, which is less than "Y". Furthermore, the ratio of X:Y is larger than the ratio of X1:Y1. Web-page 94 includes IMG tags associated with images 98 that specify locations and sizes of each image on the X vs. Y grid of web-page 94. It can be seen, however, that display 124 cannot accommodate images 98 in their current dimensions and location.

Therefore, at block 325, server 58 analyzes web-page 94 to determine how to generate the dimensions and locations for images 98 in a manner that produces a reasonable facsimile of the original layout of web-page 94 when those images 98 are finally generated on display 124. The methodology by which such a determination is made is not particularly limited. Such a methodology can include, by way of non-limiting example, having server 58 render the page fully by emulating device 54 to determine what layout device 54 would actually require. That is, server 58 can be configured to have the same code as web browser application 136 and other code modules of device 54 so the output on server 58 is substantially the same as on device 54. Another, arguably less complex solution is to just transcode each image and then replace the original image tags IMG tags with the new height/width. In the present embodiment, it is assumed the latter is performed as server 58 thus generates modified versions of the IMG tags associated with images 98 on web-page 94, which are then sent to device 54.

At block 330 device 54 receives the modified image tags generated at block 325, and at block 335, processor 108, executing browser application 136 begins generating web-page 94 on display 124 using the modified version of the IMG tags received at block 330. At this point it can be noted that method 300 is directed to the processing of images 98, but in parallel with method 300, browser application 136 can continue to generate aspects of web-page 94 on display 124 that do not involve images 98 in the usual manner.

FIG. 5 shows exemplary performance of block 330, as place holders for images 98 are shown generated on display 124, but such place holders are generated using the modified version of the IMG tags received at block 330, and therefore the place holders for images 98 are generated on display 124 in locations that differ from web-page 94 as originally stored on server 82. Note that while not shown in FIG. 5, web-page 94 can include content other than images 98, (such as text, fillable forms) and such non-image content can also be generated on display 124 in relation to the image place holders.

Block 340 comprises processing the requested image content using the modified image tags. Server 58 can thus transcode images 98 into a format (e.g. size) that conforms with the modified image tags generated at block 325 and ready-for-placement into the image place holders generated at block 335 and shown in FIG. 5.

Block 345 comprises receiving the modified image content at device 54, and at block 350, processor 108, executing browser application 136 renders a version of images 98 on display 124 using the modified version of images generated at block 340.

To provide a further specific illustrative example, an exemplary original IMG Tag associated with image 98-1 might indicate, along with positional information, as follows: <img src="logo.gif" width=480 height=600>, in which case this IMG Tag would be ascertained at block 320. A modified version of the original IMG Tag generated at block 325 might indicate, along with modified positional information, as follows: <img src="logo.gif" width=100 height=200>. In this example a further advantage is apparent as the size of original image 98-1 was by the original IMG tag, but without the benefit of the novel and inventive teachings herein, device 54 would reserve an incorrect size since the final resulting size would not be known until transcoding and the transcoded image was passed to device 54.

Advantageously, it will now be apparent that when image place holders are generated on display 124 at block 335, any other content generated on display 124 will not be moved but will remain substantially fixed on display 124 for the remainder of method 300. Therefore, interaction with content on display 124 (e.g. interaction via input received from keyboard 100 or pointing device 102) can be effected as of block 335 without concern that the content on display 124 will ultimately shift in location when block 350 is reached.

Variations of the foregoing are contemplated. For example, FIG. 7 shows system 50b which is a variation on system 50 and like elements in system 50b include like references to their counterparts in system 50, except followed by the suffix "b". However, unlike system 50, in system 50b, server 58 is implemented as a first server 58b-1 and a second server 58b-2, and a link 79b is provided between server 58b-1 and server 58b-2.

In system 50b, server 58b-1 can be implemented, in a non-limiting example, as an enterprise server, such as a Blackberry Enterprise Server that is hosted and maintained by an enterprise that is associated with device 54b whereas server 58b-2 can be implemented as a relay server such as a Relay Server that is hosted and maintained by a carrier, or a carrier partner such as Research In Motion Inc. However, the entity or entities that host(s) and maintain(s) each server 58b-1 and server 58b-2 is not particularly limited and is discussed herein as an example of a potential real-world implementation. In terms of technical structure, server 58b-1 can be referred to as a content intermediation server 58-1, whereas server 58b-2 can be referred to as a transport intermediation server. In a present embodiment, method 300 can be performed by server 58b-1 but passing the various communications between device 54b and server 58b-1 through server 58b-2. Such communications can be passed in encrypted form, if desired, by providing a key pair or other encrypting means at server 58b-1 and device 54b, such that communications carried through server 58b-2 are secure.

Various advantages will now be apparent. For example, where browser application 136 is configured not to render images at all (a setting that is available in various web-browser applications), then the teachings herein can provide generation of a web-page on device 54 with the proper image place-holders, in a manner that substantially accurately reflects where those images are in relation to other content. Without the teachings herein, a web-browser application with images turned off would generate a web page in a manner that never reflected the size of the images.

It should be understood that the type of content need not be limited to web-pages, and can include emails, media, applications, application data, or any other type of content that device 54b can be configured to access from network 74b and which can include pictures with IMG tags.

The claims attached hereto define the scope of the monopoly sought.

The invention claimed is:

1. A portable electronic device, comprising:
   a display;
   a network interface;
   a processor interconnected with the display and the network interface, the processor configured to:
      send a request for content to an intermediation server via the network interface, the content including images and unmodified image tags specifying locations and dimensions for respective ones of the images;
      receive, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and
      control the display to present the content excluding the images, and to present image place holders having the modified locations and dimensions, using the modified image tags.

2. The portable electronic device of claim 1, the processor further configured to:
   after controlling the display to present the image place holders and the content excluding the images, receive modified images from the intermediation server via the network interface; the modified images generated by the intermediation server based on the modified image tags; and
   control the display to render the modified images within the image place holders.

3. The portable electronic device of claim 2, wherein the modified images have dimensions corresponding to the modified dimensions specified in the modified image tags.

4. The portable electronic device of claim 2, the processor configured to render the modified images without moving the content excluding the images as presented on the display.

5. The portable electronic device of claim 1, further comprising an input device interconnected with the processor; the processor configured to send the request for content in response to input received from the input device.

6. The portable electronic device of claim 1, the processor further configured to send the size of the display to the intermediate server with the request for content.

7. A method in a portable electronic device having a display, a network interface and an input device each interconnected with a processor, the method comprising:
   sending a request for content to an intermediation server via the network interface, the content including images and unmodified image tags specifying locations and dimensions for respective ones of the images;
   receiving, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and
   presenting the content excluding the images, and presenting image place holders having the modified locations and dimensions, using the modified image tags.

8. The method of claim 7, further comprising:
   after controlling the display to present the image place holders and the content excluding the images, receiving modified images from the intermediation server via the network interface; the modified images generated by the intermediation server based on the modified image tags; and
   rendering the modified images within the image place holders on the display.

9. The method of claim 8, wherein the modified images have dimensions corresponding to the modified dimensions specified in the modified image tags.

10. The method of claim 8, wherein the rendering comprises rendering the modified images without moving the content excluding the images as presented on the display.

11. The method of claim 7, wherein the sending is performed in response to input received at the processor from the input device.

12. The method of claim 7, further comprising sending the size of the display to the intermediate server with the request for content.

13. A non-transitory computer-readable medium storing a plurality of computer-readable instructions executable by a processor of a portable electronic device having a display, a network interface and an input device each interconnected with the processor, for performing a method comprising:
   sending a request for content to an intermediation server via the network interface, the content including images and unmodified image tags specifying locations and dimensions for respective ones of the images;
   receiving, from the intermediation server via the network interface, the content excluding the images, and including modified image tags in place of the unmodified image tags, the modified image tags specifying modified locations and dimensions for respective ones of the images, and generated from the unmodified image tags at the intermediation server based on a size of the display; and
   presenting the content excluding the images, and presenting image place holders having the modified locations and dimensions, using the modified image tags.

14. The non-transitory computer-readable medium of claim 13, the method further comprising:
   after controlling the display to present the image place holders and the content excluding the images, receiving modified images from the intermediation server via the network interface; the modified images generated by the intermediation server based on the modified image tags; and
   rendering the modified images within the image place holders on the display.

15. The non-transitory computer-readable medium of claim 14, wherein the modified images have dimensions corresponding to the modified dimensions specified in the modified image tags.

16. The non-transitory computer-readable medium of claim 14, wherein the rendering comprises rendering the modified images without moving the content excluding the images as presented on the display.

17. The non-transitory computer-readable medium of claim 13, wherein the sending is performed in response to input received at the processor from the input device.

18. The non-transitory computer-readable medium of claim 13, the method further comprising sending the size of the display to the intermediate server with the request for content.

* * * * *